United States Patent

Ohba et al.

[11] Patent Number: 5,872,883
[45] Date of Patent: Feb. 16, 1999

[54] CURVED OPTICAL WAVEGUIDE AND METHOD OF MANUFACTURING THE SAME

[75] Inventors: Michio Ohba; Yasunari Kawabata; Kuniaki Jinnai, all of Tokyo, Japan

[73] Assignee: Mitsubishi Gas Chemical Company, Inc., Tokyo, Japan

[21] Appl. No.: 753,433

[22] Filed: Nov. 25, 1996

[30] Foreign Application Priority Data

Nov. 28, 1995 [JP] Japan ................................ 7-208950

[51] Int. Cl.$^6$ .............................. G02B 6/10; G03G 17/04
[52] U.S. Cl. .............................. 385/129; 385/14; 385/15; 385/32; 385/46; 385/131; 385/146; 385/147; 430/33; 430/56; 430/57; 430/60
[58] Field of Search ................................ 385/14, 15, 31, 385/32, 46, 123, 129, 131, 146, 147; 430/56, 57, 60, 61, 33

[56] References Cited

U.S. PATENT DOCUMENTS

| | | | |
|---|---|---|---|
| 3,752,561 | 8/1973 | Klemt | 385/146 X |
| 4,824,194 | 4/1989 | Karasawa | 385/146 X |
| 5,381,506 | 1/1995 | Amick et al. | 385/129 |
| 5,402,514 | 3/1995 | Booth et al. | 385/130 |
| 5,526,449 | 6/1996 | Meade et al. | 385/14 |

*Primary Examiner*—Brian Healy
*Attorney, Agent, or Firm*—Sterne, Kessler, Goldstein & Fox P.L.L.C.

[57] ABSTRACT

The present invention provides a curved optical waveguide with reduced loss. Particularly, it relates to a waveguide with rectangular cross-section which has a curved portion, wherein the relation between the width D of the waveguide at the curved portion and the radius R of the curvature is $R/D \leq 500$. This waveguide is provided with at least one cladding inside the core of said curved portion, thereby dividing the waveguide at the curved portion in a plurality of narrow optical waveguides. This enables a large reduction of the loss even in curved optical waveguides with sharp curves, and realizes inexpensive optical waveguides.

7 Claims, 6 Drawing Sheets

CURVED OPTICAL WAVEGUIDE AND METHOD OF MANUFACTURING THE SAME

BACKGROUND OF THE INVENTION

1. Field of the Invention

The present invention relates to an optical waveguide and a method of manufacturing the same. In particular, it relates to a curved optical waveguide which connects two points for which the optical axes of the incident ray and the outgoing ray are not identical, and a method of manufacturing such waveguide.

2. Description of the Related Art

Optical components such as optical couplers, optical star couplers and optical modules are relevant to the field of optical LANs, telecommunication and optical instrumentation control, etc. In recent years, these optical components have been widening their field of application at a rapid pace, and, corresponding with this movement, the demand for compact components with high efficiency is becoming greater. In connection with the optical components above, optical waveguides are utilized for branching or combining optical signals, or for connection with light-emitting or light-receiving devices such as LD, LED and PD. Optical waveguides are composed of a core with high refractive index for light propagation, and a cladding with low refractive index which surrounds the core. They are characterized in that the aimed purposes can be achieved through adequate designing of the optical waveguide patterns of the core and the cladding.

A generally adopted method for using optical waveguides for guiding light from one point (P) to another point (Q) is to connect these two points by using curved waveguides to keep the loss in the waveguides as low as possible in cases where the propagating directions of the incident light at point P and the outgoing light at point Q are not identical. For example, by employing a method of connecting the arced portion and straight portion so that the direction of the tangent at an arbitrary point along the optical waveguide between points P and Q and the direction of the light propagation are identical, it is possible to determine a most preferable shape of the optical waveguide. Therefore, one optical waveguide with the shape determined by the above method has been conventionally used.

However, when using said curved optical waveguide, there is a curvature loss, a loss peculiar to the curved portion. A resulting problem is that the loss becomes greater with optical waveguides which are curved at acute angles.

Now, the curvature loss will be described with reference to the drawings. The explanation in the specification below relates only to optical waveguides with rectangular-shaped cross-sections, and the drawings are planar views. In order to simplify the explanations, only light which proceeds parallel to the planar face of the optical waveguide will be considered.

FIGS. 3(a) and 3(b) indicate the directions of light propagation at two curved optical waveguides which both have the same width but different curvature radiuses.

In FIG. 3(a), the incident ray in the core at point A reaches point B on the interface between the core and the clad, and is thereafter either completely outgoing into the core, or a portion of the light penetrates into the clad and incurs light leakage.

On the other hand, in FIG. 3(b), the incident ray in the core at point E reaches point F on the interface between the core and the clad, and is thereafter either completely outgoing into the core, or a portion of the light penetrates into the clad and incurs light leakage.

In both FIGS. 3(a) and 3(b), if said light is completely outgoing into the core, there is no loss, but if light leaks, this becomes the curvature loss mentioned above. Whether said light will be completely outgoing into the core or will leak is determined by the angle $\alpha$ ($\beta$) formed by the tangent of the interface at point B (F) and the line portion AB (EF). If angle $\alpha$ ($\beta$) is smaller than the critical angle of incidence, complete reflection occurs. If angle $\alpha$ ($\beta$) is larger than the critical angle, a portion of the light penetrates into the cladding and leaks. The critical angle is hereby indicated as per the following formula:

$$\text{Critical angle} = \cos^{-1}(n_1/n_2)$$

$n_1$ is the refractive index of the cladding and $n_2$ is the refractive index of the core.

As shown by FIGS. 3(a) and 3(b), $\alpha < \beta$, and it is clear that the sharply curved waveguide (in FIG. 3(b)) is more likely to incur light leakage as the angle formed by the tangent of said interface and the line portion is greater. Provided that the relation $\alpha <$ critical angle $< \beta$ is true, light will disseminate as shown by the arrows in FIG. 3. In other words, whereas in FIG. 3(a) said light is totally reflected, there is light leakage in FIG. 3(b). As a result, when arbitrarily setting the position of point A (E) or the direction of the light propagation from point A (E), the sharper the curve, the greater the rate of light leakage in the curved optical waveguide.

With respect to optical waveguides with curved portions of the same radius of curvature but different widths, taking as examples the waveguide in FIG. 3(a) with its left side shown by solid lines and the same waveguide with its left side shown by dotted lines (going through point C), the range of the point of incidence (range of point A) of the wider optical waveguide can be considered to have shifted in a direction in which the light leakage increases, so that the greater the width of the optical waveguide, the greater the loss. In this way, waveguides having curved portions inevitably incur loss due to the curvature. However, the degree of loss differs with the waveguide width (D) at the curved portion and the radius (R) of the curvature, depending approximately on the ratio R/D. The smaller the R/D, the greater the loss based on the curvature. Furthermore, when determining D and R, the appropriate range for the waveguide width D is determined among others as a consequence of the core radius of the optical fiber to be connected with this optical waveguide, so that the curvature radius R is important in deciding the shape of the optical waveguide.

Recently, demands for compact optical components such as optical couplers are becoming greater, so that optical waveguides also need to be made as compact as possible to achieve this purpose. In order to make waveguides more compact, it is vital to shorten the length of the optical waveguide, and there arises the necessity to connect two points at a short distance with differing directions of the incident ray and the outgoing ray via an optical waveguide, which inevitably brings along sharply curved optical waveguides. As described above, sharply curved portions greatly increase curvature loss and make it difficult to obtain optical waveguides which satisfy the required performance.

SUMMARY OF THE INVENTION

The present invention aims to solve these problems of the conventional art by providing a compact and highly efficient, curved optical waveguide with little curvature loss. It also aims at providing a method for manufacturing such optical waveguide.

The present invention provides an optical waveguide with a rectangular cross-section including a curved portion, this curved portion being constructed such that the relation between the radius R of the curvature and the width D of the waveguide is R/D≦500 and that at least one cladding is provided inside its core, such cladding dividing said curved portion in the widthwise direction.

This construction offers largely reduced loss due to curvature, as the inside of the core of the optical waveguide is divided into a plurality of narrow waveguides.

The relation between said curvature radius R and waveguide width D is preferably 10≦R/D≦500.

The reason therefor is that with curved optical waveguides that have too small an R/D value (for example, R/D =5), the curvature loss above becomes excessively large, so that even if claddings were provided inside the core, it would be difficult to hold the loss sufficiently small, tending to lack practicability. Furthermore, concerning optical waveguides with a gently curved portion for which the R/D exceeds 500, the curvature loss itself is so small that there is no need to provide the cladding inside the core. Therefore, it is especially preferable for practical purposes that the relation between the radius R of the curvature and the width D of the optical waveguide is 10≦R/D≦500.

It is preferable to select the number of said claddings within the range of at least one but not more than three. In other words, it is preferable to divide the inside of said core into two to four portions by the claddings.

Furthermore, the width of the tip of said cladding is preferably not more than ⅕ of the width of the waveguide at a location corresponding to such tip portion, and not more than 10 µm. More preferably, the width of the tip of said cladding is at least 1 µm but not more than 5 µm. This allows the increase in light leakage due to the provision of claddings to be held at a minimum.

If the width d of the tip of the cladding (cf. FIG. 4) is large, the light leakage increases at this portion, making it necessary to make width d small, that is, preferably within the range described above. If the width d is held too small, the border between the core and the cladding becomes unclear, so that the cladding actually becomes meaningless. Therefore, it is most preferable to set width d around 1 through 5 µm with optical waveguides which are approximately 40 through 200 µm wide.

FIG. 1 indicates an optical waveguide provided with a cladding of constant width inside the core. This kind of optical waveguide shape requires a cladding 2 which is wider than 5 µm in order to obtain a cladding which is clearly distinguished from core 1. As result, the width of the tip 2A of cladding 2 may exceed the range of 1 through 5 µm, which is especially preferable as such width, possibly incurring an increase in light leakage at tip 2A.

The optical waveguide relating to the present invention may further comprise a straight portion formed in continuance of said curved portion, wherein the tip of said cladding is formed in the vicinity of the border between such curved portion and the straight portion. Thereby, the light leakage can be reduced further.

Concerning optical waveguides made only of a curved portion, the tip of the cladding may be formed at an arbitrary location in the vicinity of the end of the optical waveguide.

However, the width of said cladding other than at its tip only needs to be in a range to satisfy the functions of the cladding and need not be specifically defined. For example, the cladding may have a constant width or be shaped to be wider when going further away from the tip, allowing application of various shapes.

The present invention also provides a method for manufacturing an optical waveguide, comprising the steps of irradiating a light-transmissive polymer film which a contains light reactive monomer via a mask which has an optical waveguide pattern with the cladding according to the above, and thereby reactivating the light reactive monomer of the exposed portion, and drying and removing the non-reactant monomer of the non-exposed portions at said irradiation.

This method allows an optical waveguide relating to the present invention to be manufactured easily.

DESCRIPTION OF THE PREFERRED EMBODIMENTS

Now, an embodiment according to an embodiment of the present invention will be described. This embodiment is a concrete explanation of one example of an optical waveguide according to the present invention, and is not aimed at limiting the scope of the embodiment of the present invention or the scope of the invention itself.

FIG. 2 and FIGS. 6 through 10 are planar views showing one example of the optical waveguide according to an embodiment of the present invention.

The optical waveguides shown in these drawings are made of a core 1 with a high refractive index for light propagation and a cladding 3 with a low refractive index arranged on the circumference of core 1.

Cladding 2 is formed inside core 1 so as to divide the inner space of core 1. The width of tip 2A of this cladding 2 is set within the range of 1 through 5 μm. In order to make the width of the waveguide after division by this cladding 2 constant, cladding 2 is designed to be shaped smoothly and gradually wider towards the middle of the arc.

Now, this embodiment will be described more specifically with reference to FIG. 6.

Figure 1:
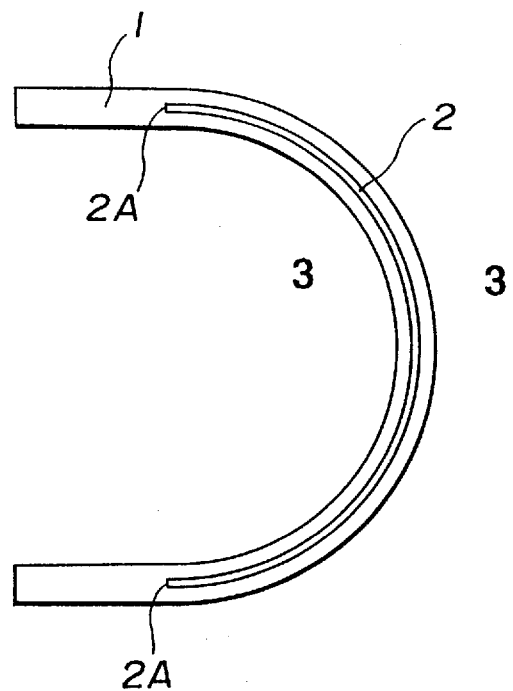
FIG. 1 is a planar view of the optical waveguide according to an embodiment of the present invention showing a cladding provided inside the core.
Figure 2:
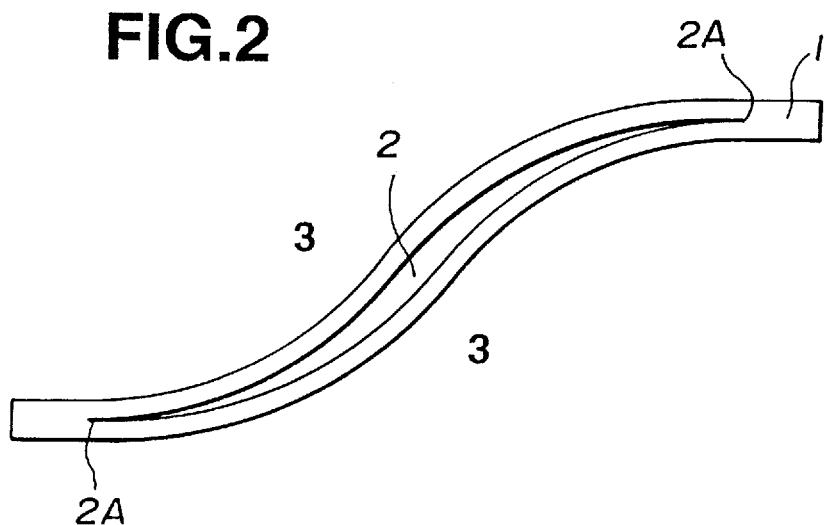
FIG. 2 is a planar view of the optical waveguide according to an embodiment of the present invention showing a cladding provided inside the core.
Figure 3A:
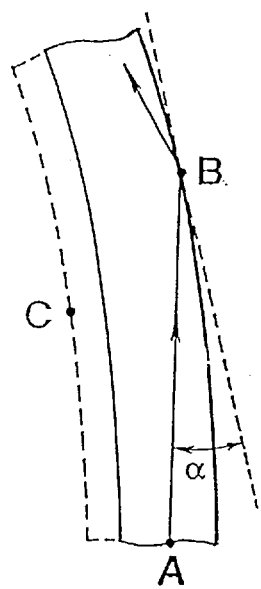
FIGS. 3(a) and (b) shows a planar views of the optical waveguide according to an embodiment of the present invention illustrating the light propagation at its curved portion.
Figure 3B:
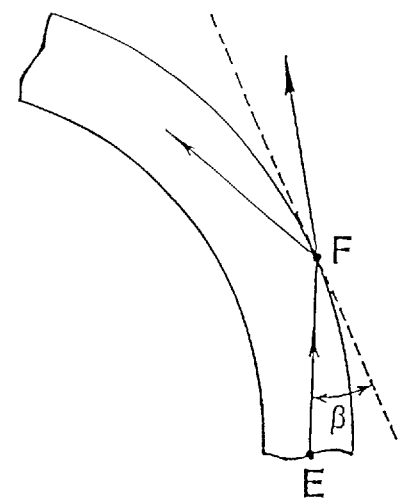
Figure 4:
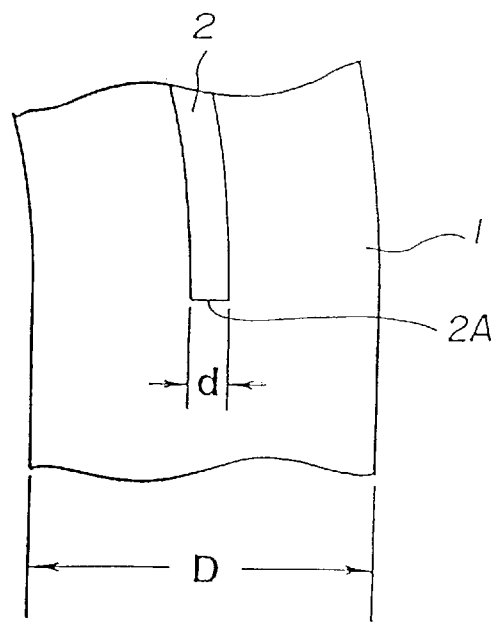
FIG. 4 is a planar view of the optical waveguide according to an embodiment of the present invention showing the tip of the cladding provided inside the core.
Figure 5:
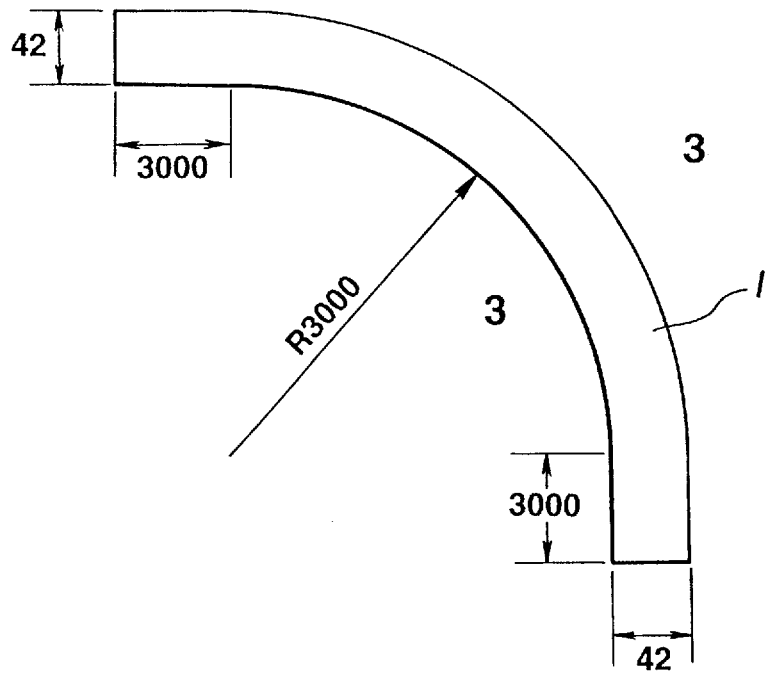
FIG. 5 is a planar view of a curved optical waveguide having no cladding inside the core.
Figure 6:
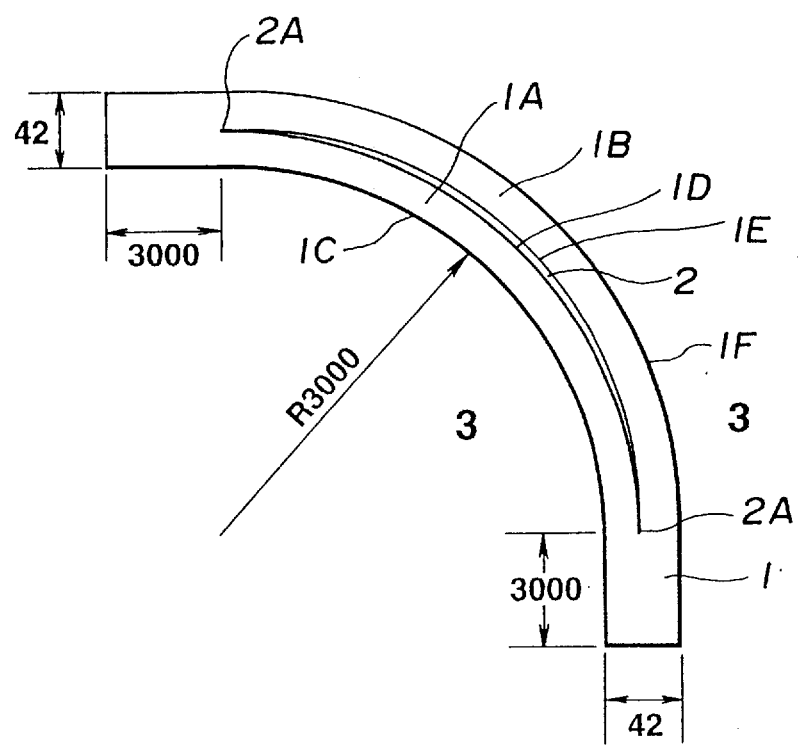
FIG. 6 is a planar view of the waveguide according to an embodiment of the present invention with one cladding provided inside the core.
Figure 7:
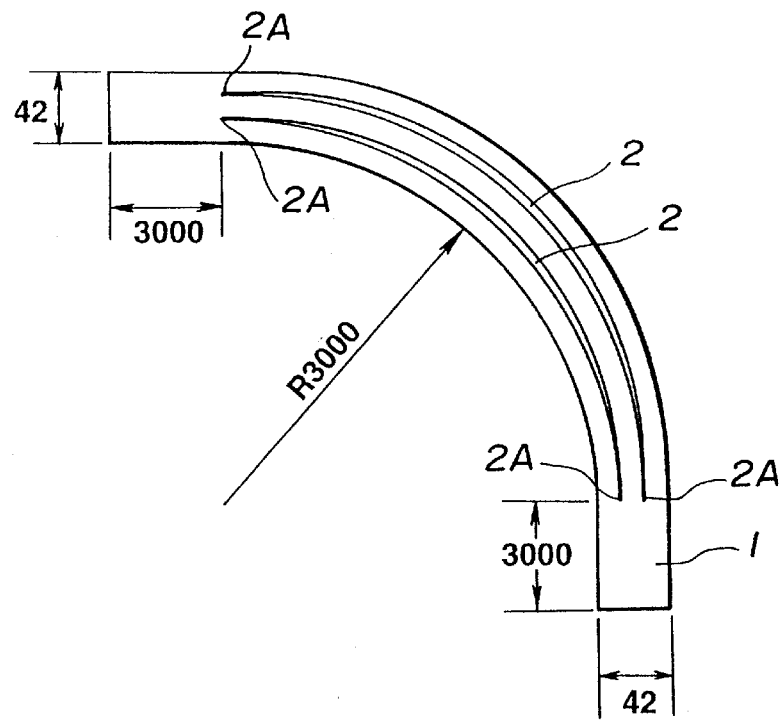
FIG. 7 is a planar view of the waveguide according to an embodiment of the present invention with two claddings provided inside the core.
Figure 8:
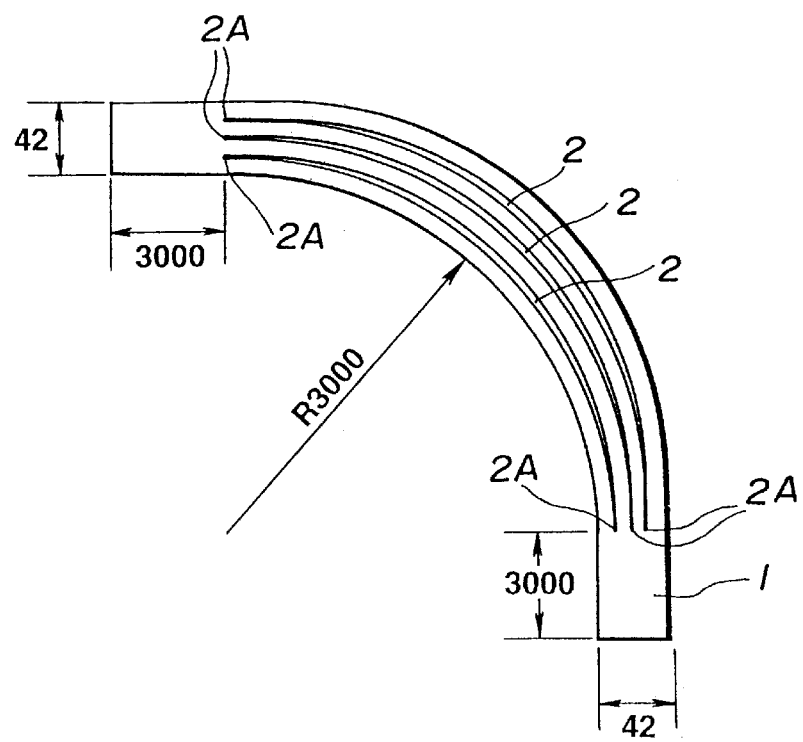
FIG. 8 is a planar view of the waveguide according to an embodiment of the present invention with three claddings provided inside the core.
Figure 9:
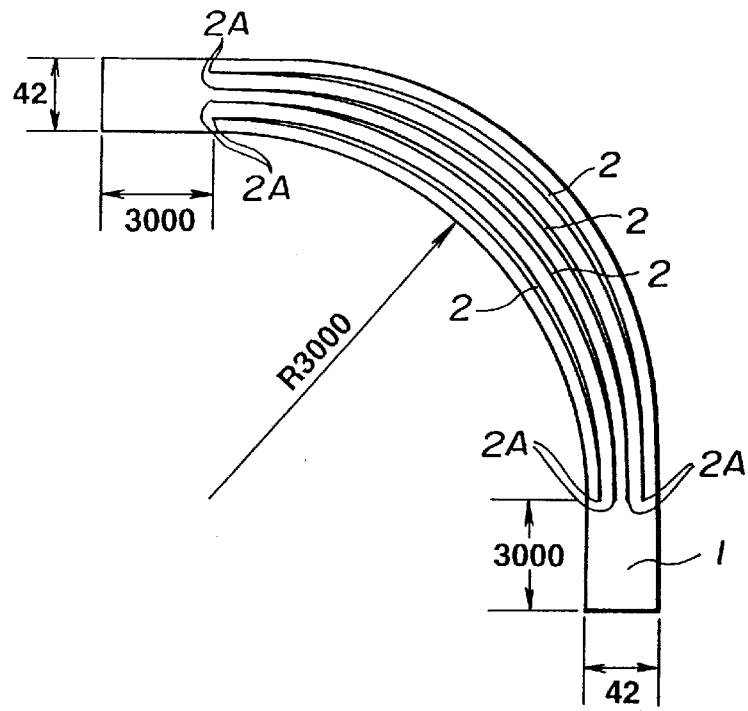
FIG. 9 is a planar view of the waveguide according to an embodiment of the present invention with four claddings provided inside the core.
Figure 10:
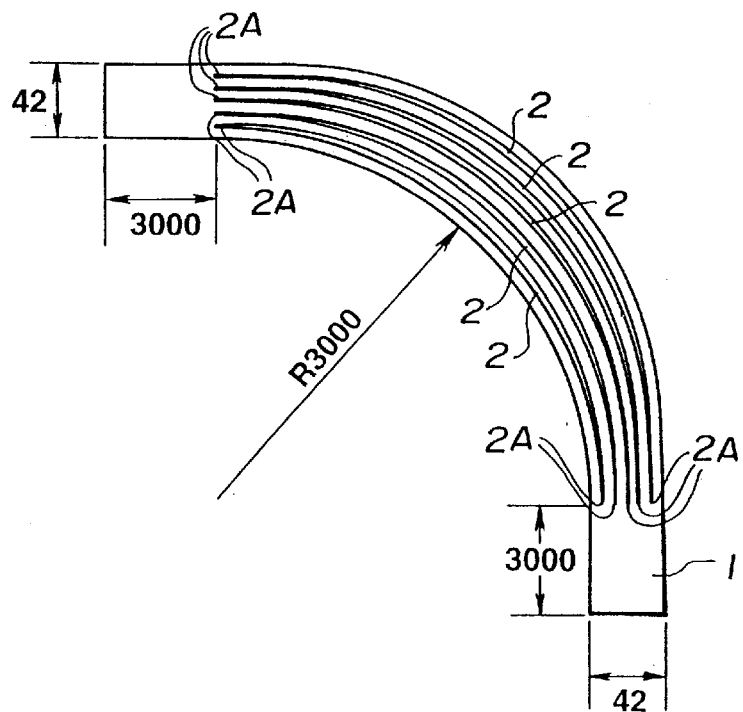
FIG. 10 is a planar view of the waveguide according to an embodiment of the present invention with five claddings provided inside the core.

FIG. 6 shows an example where one cladding 2 has been formed inside core 1 of the optical waveguide shown in FIG. 5, and the inside of core 1 has been halved through this cladding 2 to obtain waveguides with the same width.

As shown in FIG. 6, core 1A, which is one of the core 1 halves divided by cladding 2 and which is located on the inner side, is made of a quarter arc with a curvature radius of 3000 μm for the inner interface 1C, and a quarter arc with a curvature radius of 3021 μm for the outer interface 1D.

On the other hand, core 1B which is located on the outer side of the divided core 1 is made of a quarter arc with a curvature radius of 2921 μm for the inner interface 1D, and a quarter arc with a curvature radius of 2942 μm for the outer interface 1F. The centers of these two arcs are common, namely 141 μm (100 μm respectively in both the right and left directions) from the center of the quarter arc of the inner core halve in the direction of 45° to the upper right in FIG. 6.

Thereby, the halved optical waveguide curves smoothly, the width stays at a constant 21 μm, both tips 2A of cladding 2 are thin, getting smoothly and gradually wider towards the middle of the arc.

This is a result of making the interfaces 1C and 1F between core 1 and cladding 3 an arc or a smooth connection of arcs, making the arc radiuses and the centers of the interfaces 1D and 1E between the cores 1A and 1B and both sides of cladding 2 slightly differ, and to make the centers of the arc which are to be the inner and outer interfaces of the divided core 1 to be the same with radiuses differing by the width of the core 1 after division. FIGS. 7 through 10 illustrate examples where 2 through 5 claddings are provided inside core 1. In these drawings, the width of the divided core 1 is at a value obtained by dividing 42 μm, the width of core 1 before division, by the number of divisions. The centers of the arcs forming the interfaces on both sides of the core are at locations shifted in predetermined distances along the line of 45° towards the upper right direction. The width of both tips 2A of cladding 2 were set at 1 μm.

The optical waveguide according to the present invention is not limited to the materials constituting it or its manufacturing method, but, by using a photomask with an optical waveguide pattern formed thereon which has a cladding 2 inside core 1, it can be easily manufactured by employing the polymer optical waveguide manufacturing method in accordance with the selective photopolymerization method (Patent Publication Sho 56(1981)-3522) by irradiating a light-transmissive polymer film which particularly contains light reactive monomers via a photomask with a waveguide pattern formed thereon, reactivating the light reactive monomers of the exposed portion forming an optical waveguide by drying and removing the non-reactant monomer.

Figure 11:
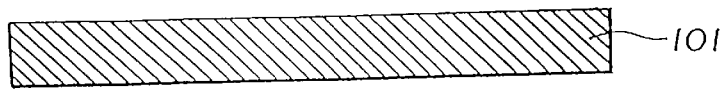
FIGS. 11(a)–(d) shows the steps in the method for manufacturing the optical waveguide according to an embodiment of the present invention.
Figure 11:
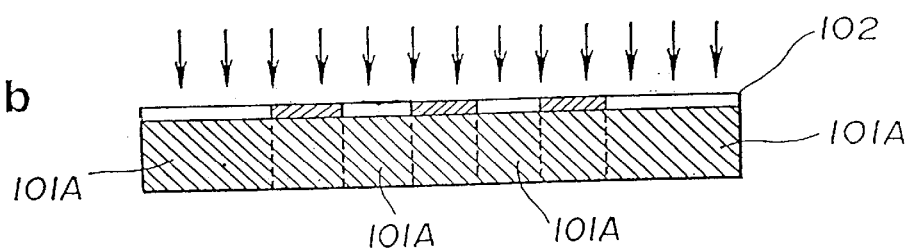
Figure 11:
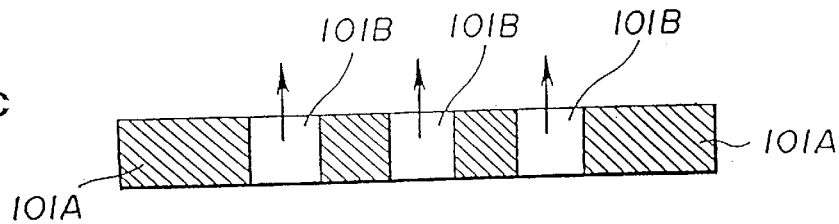
Figure 11:
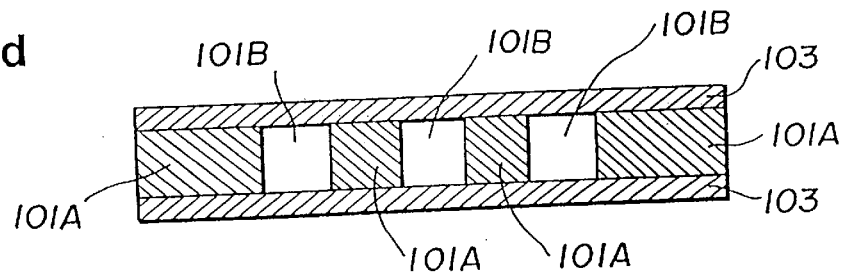

Now, the step of manufacturing the optical waveguide with this selective photopolymerization method will be described with reference to FIG. 11.

First, the step shown in FIG. 11(a) uses a light-transmissive polymer solution containing prescribed amounts of light reactive monomers and photosensitizers and produces a light-transmissive polymer film 101 containing light reactive monomers via the casting method.

Next, in the step shown in FIG. 11(b), the light-transmissive polymer film 101 obtained through the preceding step is superposed with a photomask 102 with a pattern formed thereon of an optical waveguide having cladding inside the core. Then, the light-transmissive polymer film 101 is irradiated via this photomask 102, thereby reactivating the light reactive monomer 101A of the exposed portion.

Subsequently, in the step shown in FIG. 11(c), the non-reactant monomer 101B of the non-exposed portion during the irradiation in the preceding step is removed through vacuum drying.

Then, in the step shown in FIG. 11(d), a layer of cladding 103 is formed on the front and back face of the film obtained through the step in FIG. 11(c). In this step, cladding layer 103 may also be substituted with the adhesive agent used for strengthening the optical waveguide film by the glass plate and for affixing the film at the production of the optical waveguide plate.

The above-stated selective photopolymerization method has the effect that a most preferable polymer optical waveguide can be easily manufactured which corresponds to the numerical apertures and size of the optical fiber by arranging the type or concentration of the light reactive monomers. Furthermore, it also has the advantage that the manufacturing method is inexpensive, and that it is possible to transcribe the precisely produced optical waveguide pattern of the photomask with high precision and reproducibility on the polymer film. Due to the above points, the selective photopolymerization method is one of the most preferable methods for manufacturing the optical waveguide according to the present invention.

Now, the embodiment of the present invention will be explained in further detail.

Embodiment 1

Manufacture of a quarter arced optical waveguide with curvature radius 3 mm, width 40 μm and thickness 40 μm In order to manufacture a curved optical waveguide for use with a GI optical fiber with the core diameter 50 μm and the cladding diameter 125 μm (numerical aperture 0.2), a silica photomask was manufactured which has an optical waveguide pattern with the shape and size (in μm) shown in FIG. 5 connecting the quarter arced portion and the straight portion, and using this photomask, the optical waveguide was produced in accordance with the selective photopolymerization method.

(Manufacture of Optical Waveguide)

Bisphenol Z polycarbonate resin (by Mitsubishi Gas Chemical Co., Inc., Article Name: Iupilon Z) as the matrix resin, trifluoroethyl acrylate as the low refractive index monomer, and the sensitizer benzoin ethyl ether were dissolved in methylene chloride, thereby producing a film 42 μm thick through the solvent casting method, then exposure to ultraviolet irradiation was conducted via said photomask, reactivating the portions except for the optical waveguide pattern area, and thereafter, the non-reactant monomer remaining on the waveguide portions was removed through vacuum drying to form the optical waveguide in the film. The thickness of the film after drying and the width of the waveguide were 40 μm.

After clamping and fixing this optical waveguide film between two glass boards by using this ultraviolet ray setting adhesive agent with a refractive index of 1.57, both ends were polished and the following measurements of INSERTION loss were conducted.

(Measurement of Insertion Loss)

Using a 50/125 GI optical fiber, a LED light source of wavelength 0.85 μm was connected with one face of the optical waveguide to cause illumination, and the light irradiated from the other end of the optical waveguide was guided to the optical power meter by using the same optical fiber, there measuring the intensity of the output light. Then, without using the optical waveguide, the LED light was directly connected with the power meter through the same optical fiber, there measuring the light intensity, this being equivalent to the intensity of the input light in the optical waveguide. Through these measurements, the insertion loss was calculated per the following formula:

Insertion loss (dB)=−10×Log(intensity of output light/intensity of input light)

In the same way, as examples providing 1 through 5 claddings according to the present invention in the curved optical waveguide of FIG. 5, a photomask with an optical waveguide pattern of the shape and size indicated in FIGS. 6 through 10 was manufactured, therewith manufacturing the optical waveguide and measuring the insertion loss. Moreover, the cladding tips are all 1 μm wide including embodiments 2 through 4 below. The measurement results thereof are shown in Table 1.

As in the present embodiment, a sharply curved optical waveguide with a curvature radius of 3 mm and an R/D value of 75 cannot avoid a great insertion loss of as much as 9.7 dB, but by providing 2 or 3 claddings according to the present invention, this value could be improved by at least 5 dB. It was also found that even one cladding was very effective.

In the above description of the curvature loss, provided that the curvature radius is the same, the narrower the width of the optical waveguide, or in the present invention, the greater the number of claddings, the smaller the loss should be, but to the contrary, as result of measurements of the insertion loss, 4 or more claddings tended to increase the loss. As it is difficult to produce an ideal interface between the core of the optical waveguide and the cladding, and said interface is in reality an imperfect one, the above tendency is considered to be due to increased reflections at such interface when the width becomes narrower, and light leakage increases due to the reflections at an imperfect interface. In this way, in most cases, only 1 through 3 claddings are most preferable in practice.

Embodiment 2

Manufacture of a quarter arced optical waveguide with curvature radius 5 mm, width 40 μm and thickness 40 μm In order to manufacture a curved optical waveguide with a curvature radius 5 mm which is larger than the radius in Embodiment 1 which has no cladding and one which has one cladding, a photomask provided with an optical waveguide pattern with substantially similar shape as in FIGS. 5 and 6 was manufactured, an optical waveguide was manufactured in the same way, and measurement of the insertion loss was conducted.

The measurement results thereof are shown in Table 2.

According to the present embodiment, the insertion loss was greatly improved from 5 dB to 2.6 dB by providing one cladding.

Embodiment 3

Manufacture of a quarter arced optical waveguide with curvature radius 16 mm, width 40 μm and thickness 40 μm In order to manufacture a widely curved optical waveguide with a curvature radius 16 mm which is larger than the radius in Embodiment 1 which has no cladding and one which has one cladding, a photomask provided with an optical waveguide pattern with substantially similar shape as in FIGS. 5 and 6 was manufactured, an optical waveguide was manufactured in the same way, and measurement of the insertion loss was conducted.

The measurement results thereof are shown in Table 2.

According to the present embodiment, the insertion loss was somewhat improved by providing one cladding.

Embodiment 4

Manufacture of a quarter arced optical waveguide with curvature radius 10 mm, width 150 μm and thickness 150 μm In order to manufacture a curved optical waveguide for use with an SI optical fiber with the core diameter 200 μm and the cladding diameter 230 μm (numerical aperture 0.4) which has no cladding and one which has one cladding, a photomask provided with an optical waveguide pattern with substantially similar shape as in FIGS. 5 and 6 was manufactured, an optical waveguide was produced in accordance with the selective photopolymerization method substantially similarly as in Embodiment 1, and measurement of the insertion loss was conducted.

The measurement results thereof are shown in Table 2.

According to the present embodiment, the insertion loss was also greatly improved by providing one cladding.

TABLE 1

|  | Embodiment 1 | | | | | |
| --- | --- | --- | --- | --- | --- | --- |
| Test No. | 1 | 2 | 3 | 4 | 5 | 6 |
| Curvature radius (mm) | 3 | | | | | |
| Width, thickness (μm) | 40 | | | | | |
| R/D | 75 | | | | | |
| Number of claddings | None | 1 | 2 | 3 | 4 | 5 |
| Insertion loss (dB) | 9.67 | 5.38 | 4.18 | 4.17 | 4.70 | 5.32 |

TABLE 2

|  | Embodiment 1 | | 2 | | 3 | |
| --- | --- | --- | --- | --- | --- | --- |
| Test No. | 1 | 2 | 1 | 2 | 1 | 2 |
| Curvature radius (mm) | 5 | | 16 | | 10 | |
| Width, thickness (μm) | 40 | | 40 | | 150 | |
| R/D | 125 | | 400 | | 67 | |
| Number of claddings | None | 1 | None | 1 | None | 1 |
| Insertion loss (dB) | 5.00 | 2.60 | 2.60 | 2.31 | 6.54 | 3.32 |

As is clear from the description above, the present invention offers dramatic effects in the reduction of the loss in curved optical waveguides, improves the efficiency of optical waveguides and easily provides compact waveguides, thereby contributing greatly to the expansion of the field of application thereof.

What is claimed is:

1. An optical waveguide with rectangular cross-section having a core and a cladding arranged on the circumference of said core, comprising a curved portion, said curved portion being constructed so that the relation between the radius R of the curvature and the width D of the waveguide is R/D≦500 and that at least one cladding is provided inside said core, said cladding provided inside said core dividing said curved portion in the widthwise direction.

2. An optical waveguide according to claim 1, wherein the relation between said curvature radius R and waveguide width D is 10≦R/D≦500.

3. An optical waveguide according to claim 1 having at least one but not more than three of said cladding.

4. An optical waveguide according to claim 1, wherein the width of the tip of said cladding is not more than 1/5 of the width of the waveguide at a location corresponding to said tip portion, and not more than 10 μm.

5. An optical waveguide according to claim 4, wherein the width of the tip of said cladding is at least 1 μm but not more than 5 μm.

6. An optical waveguide according to claim 1, further comprising a straight portion formed in continuance of said curved portion, wherein the tip of said cladding is formed in the vicinity of the border between said curved portion and the straight portion.

7. A method for manufacturing an optical waveguide, comprising the steps of:

irradiating a light-transmissive polymer film which contains light reactive monomer via a mask which has a pattern formed thereon of an optical waveguide having cladding inside the core, and thereby reactivating the light reactive monomer of the exposed portion; and drying and removing the non-reactant monomer of the non-exposed portions at said irradiation.

* * * * *